United States Patent
Fensel et al.

(12) 
(10) Patent No.: US 6,300,394 B1
(45) Date of Patent: *Oct. 9, 2001

(54) COAL TAR COMPOSITIONS MODIFIED BY NITRILE BUTADIENE RUBBER

(75) Inventors: Fred A. Fensel, Shaker Heights; Frank Janoch, Mentor; Nathan Schaus, Twinsburg; Joseph W. Mellott, Stow, all of OH (US)

(73) Assignee: The Garland Company, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,677

(22) Filed: Jan. 13, 2000

Related U.S. Application Data

(63) Continuation of application No. 09/212,805, filed on Dec. 16, 1998, now abandoned.

(51) Int. Cl.[7] .................................................... C08L 95/00
(52) U.S. Cl. ................................................ 524/66; 524/59
(58) Field of Search ......................................... 524/59, 66

(56) References Cited

U.S. PATENT DOCUMENTS

| | | | | |
|---|---|---|---|---|
| 2,331,979 | * | 10/1943 | Henderson | 524/66 |
| 3,027,342 | * | 3/1962 | Kemp et al. | 524/66 |
| 3,128,261 | * | 4/1964 | Lane et al. | 524/66 |
| 3,391,098 | * | 7/1968 | Kemp | 524/66 |
| 3,835,117 | * | 9/1974 | Walaschek | 524/66 |
| 3,846,362 | * | 11/1974 | Reinecke et al. | 524/66 |
| 3,897,380 | * | 7/1975 | Walaschek | 524/66 |
| 4,080,350 | * | 3/1978 | Briscoe et al. | 524/66 |
| 5,455,291 | * | 10/1995 | Bruns | 524/66 |
| 5,578,663 | * | 11/1996 | McGovern | 524/66 |
| 5,854,322 | * | 12/1998 | Mellott | 524/66 |
| 5,922,124 | * | 7/1999 | Supplee | 524/66 |
| 5,969,013 | * | 10/1999 | Brzozowski et al. | 524/66 |

FOREIGN PATENT DOCUMENTS

| 1426988 | * | 9/1988 | (RU) | 524/66 |
|---|---|---|---|---|

* cited by examiner

*Primary Examiner*—Peter Szekely
(74) *Attorney, Agent, or Firm*—Oldham & Oldham Co., L.P.A.

(57) ABSTRACT

A modified coal tar useful in roofing applications, containing coal tar, a nitrile butadiene rubber, and in some instances an effective amount of a plasticizer is prepared by heating the coal tar to a molten temperature, adding the rubber in powder form and agitating the material in a suitable high shear mixing apparatus until adequate phase inversion occurs between the polymer and the coal tar phase. After preparation, the material is cooled in containers until use, at which time it is heated to a flowable temperature and applied using a roofing mop or squeegee. Effective plasticizers include the alkyl esters of di-functional carboxylic acids, such as di-octyl adipate and di-octyl phthalate.

12 Claims, No Drawings

COAL TAR COMPOSITIONS MODIFIED BY NITRILE BUTADIENE RUBBER

This application is a continuation in part of Ser. No. 09/212,805, filed Dec. 16, 1998, now abandoned, which was with commonly-owned application Ser. No. 08/915,416, filed on Aug. 20, 1997, now U.S. Pat. No. 5,854,322, issued Dec. 29, 1998.

The present invention relates to a roofing material and a sealing composition. Specifically, the present invention relates to a roofing system where a molten modified coal tar is used as a base, interply, and surface material for waterproofing of existing and new facilities. Even more specifically, the present invention relates to a modified coal tar composition in which the coal tar is modified by a nitrile-butadiene ("NBR") rubber. Even more specifically, the modified coal tar composition has had its flexibility modified and improved, as measured by the glass transition temperature ("$T_g$").

BACKGROUND OF THE ART

The commonly-owned patent application cited above teaches modification of a coal tar pitch by nitrile butadiene rubber. Coal tar, both refined and pitch, is known to have many inherently advantageous properties with respect to its performance in roofing and waterproofing applications, including chemical resistance, ultraviolet resistance, and ozone resistance. However, it is also known that coal tar has physical limitations to its use. For example, the low softening point of coal tar limits it to low or no slope applications. The brittleness of coal tar at room temperatures or below causes it to crack, delaminate and show poor cohesive strength. Also, coal tar is used with some reservation due to its high level of volatile emissions upon heating in kettle applications. Further, when coal tar compositions are used to fill cracks and joints between adjacent concrete slabs on pavement surfaces or to form films for waterproofing membranes on concrete slabs, it is essential that the composition adhere well to the concrete substrate. Tars and pitches, in their native form, have the unsatisfactory property of becoming brittle and cracking, as well as pulling away from the concrete. This can result in water penetration and the subsequent breaking and cracking of the concrete from freeze/thaw cycles. While the cold flow and self-healing properties of coal tar will correct some of these problems at elevated temperatures and over time, the loss of sealing capability can compromise the waterproofing qualities. While the previous work cited has shown that the flow resistance of the modified coal tar may be increased at elevated temperatures and the softening point may be increased, the particular compositions taught exhibit no marked improvement in $T_g$, the well-known transition temperature for polymeric materials. Above the $T_g$ of a given material, it will possess a rubbery or semiliquid quality, allowing flexibility, while below the $T_g$, the material will act in a glassy or brittle manner and tear or fracture rather than flex. It is a desired goal to reduce the $T_g$ of a coal tar composition so that the desired flexibility is available even when ambient temperatures drop.

Other modification of coal tar pitches has used styrene-based copolymers. These polymers are thermoplastic elastomers, such as polystyrene-polybutadiene-polystyrene ("SBS") or polystyrene-polyisoprene-polystyrene ("SIS") block copolymers. An unfortunate requirement of these modifiers is the high percentage of polymer needed to achieve the elastomeric properties and improve high temperature flow resistance. They also require process oils to be added to increase the compatibility of the polymers with the coal tar blends. The high viscosity exhibited makes these materials unsuitable as an "applied in place" waterproofing material. Other known crack sealant formulations based on poly(vinyl chloride) ("PVC") and plasticizers to lower the $T_g$ are not suitable in roofing applications, since they are too viscous. Also, these materials tend to have a very short pot life.

Combining coal tars with NBR latexes in aqueous emulsions for use with appropriate fillers is used commonly for applying a waterproofing seal to asphalt pavements.

For these and other reasons, it is desirable to modify a coal tar to produce a material which softens at a higher temperature than unmodified coal tar while lowering the glass transition point, to increase the range of flexibility and cohesive strength.

SUMMARY OF INVENTION

It is, therefore, an advantage of the present invention to produce a high performance roofing product based on coal tar that has better low-temperature properties and lower accountable exposure to coal tar fractions. These and other advantages of the present invention are achieved by a modified coal tar comprising a coal tar and a nitrile butadiene rubber ("NBR"), wherein the coal tar and the NBR are blended; and wherein the coal tar is present in the range of from about 80 to about 98% by weight and the NBR is present in the range of from about 20 to about 2% by weight. In another embodiment, the coal tar is present in the range of from about 90 to about 98% by weight and the NBR is present in the range of from about 10 to about 2% by weight. In the most preferred embodiments, the nitrile butadiene rubber has a Mooney viscosity up to about 100, the coal tar is a Type I coal tar pitch or a refined coal tar, especially an RT-11 or RT-12 grade refined coal tar. In some preferred embodiments, it is desirable to incorporate up to about 10 percent by weight of a plasticizer, especially a di-alkyl ester of a di-carboxylic acid, such as di-octyl adipate and di-octyl phthalate. The NBR and plasticizer can be added in increments over a period of about fifteen minutes. In one such embodiment, the coal tar is a Type I coal tar pitch, the plasticizer is di-octyl adipate and the weight ratio of coal tar to nitrile butadiene rubber to plasticizer is 90 to 5 to 5. Another embodiment discloses that the coal tar is a Type I coal tar pitch, the plasticizer is di-octyl adipate and the weight ratio of coal tar to nitrile butadiene rubber to plasticizer is 96.5 to 2.5 to 1.0.

DETAILED DESCRIPTION OF THE PREFERRED EMBODIMENT

The formulation of the invention contains the following primary components: coal tar, nitrile butadiene rubber, and an amount of plasticizer or process oil or combination of both. Additionally, other modifying agents may be present in minor amounts relative to the primary ingredients.

Coal Tar

Coal tar pitch is a dark brown to black colored amorphous residue left after coal tar is redistilled. Refined coal tars, often referred to as RT grades, are fractions that are collected and/or blended to in the distillation process. Collectively, this application refers to coal tar pitch and refined coal tars as "coal tar." Coal tar comprises a mixture of organic compounds, having as a primary component a variety of polynuclear aromatic ("PNA") hydrocarbons, with the PNA hydrocarbons typically having from 3 to about 40 aromatic rings, including some substituted compounds. Some estimates indicate that as many as 5,000 compounds may be present in a typical coal tar. Coal tar pitches are classified into types, and the pitches useful in the present invention include those classified as Type I, or Type III Low Fuming, as defined by ASTM Method D450. For the purposes of the present invention, a preferred coal tar pitch will have a softening point between 54° C. and 64° C. Refined coal tars are generally classified in grades RT-1 through RT-12, these definitions being set by ASTM Method D490. For the purposes of the present invention, a preferred refined coal tar will have a float viscosity of 100 to 220 seconds when measured at 50° C. Such a viscosity is characteristic of an RT-11 or RT-12 coal tar.

Nitrile-butadiene Rubber

Nitrile-butadiene rubber as used in the present invention is known in the industry under a variety of names, including acrylonitrile rubber, acrylonitrile-butadiene rubber, nitrile-butadiene rubber and NBR. It is a synthetic rubber made by random polymerization of acrylonitrile (which is also commonly known as vinyl cyanide) with butadiene using a free radical catalyst, or through alternating copolymers using Ziegler-Natta catalysts. In the typical NBRs available, the acrylonitrile content will vary between about 15 to about 50%. Changing the acrylonitrile content in the NBR changes the number of pendant cyanide groups (—CN) along the chain. The polar nature of these groups affect the properties of the co-polymer. A measure of the average molecular weight of an NBR sample is provided by the determination of the Mooney viscosity, with increasing molecular weight indicated by increasing Mooney viscosity.

Plasticizers/Process Oils

These materials are organic compounds which are typically added to high molecular weight polymers, and blended compositions thereof, to facilitate processing, increase flexibility, elasticity and toughness of the final product. These effects are generally achieved through internal modification of the molecules, that is, through partial salvation. The specific plasticizers and process oils which may be useful to the present invention are described in the examples provided later in this specification.

Additives

Any of a variety of additives may be employed to improve final properties of the modified coal tar product. They may include but are not limited to fillers, antioxidants, antiozonants, oils, pigments, waxes, processing aids, alternative polymers, resins, fire retardant, or tackifiers. Types, amounts, and combinations of the alternative additives will vary based on the application type and desired performance.

General Preparation Method

A selected coal tar, either a pitch or a refined tar, having a softening point in the desired range is heated to approximately 350° F. (176° C.) in an apparatus equipped to maintain the temperature while agitating the tar. Temperatures in the range of from about 300° F. (149° C.) to about 400° F. (205° C.) are believed to be appropriate for the preparation. Some example mixer types include paddle mixers, mixer emulsifiers, Cowles type dispersors, inline high shear mixers, and any other type which can produce adequate shear to disperse a solid polymer resin as added to the molten tar. The desired plasticizer and the desired powdered NBR is added to the molten coal tar in slow, even increments. Agitation of the blended tar, plasticizer, and NBR occurs at temperature until the NBR portion is homogeneously distributed, as visually observed. The exact time of blending is dependent on the temperature of blending and the shear mechanism utilized.

For the purposes of this invention the following examples are provided to illustrate the improved properties of the modified coal tar product. These formulations do not in any form limit the wide nature of the ability to formulate products based on coal tar, NBR and plasticizer.

Test Methods Used

Several test protocols are mentioned in the following examples. These are briefly explained here, although the more detailed understanding of the tests is readily available through the American Society for Testing and Materials ("ASTM"). A penetration test provides a pseudo viscosity test of hardness/softness according to ASTM Method D5. The results are measured in decimillimeters (dmm), which is one-tenth of a millimeter. The ring-and-ball softening point is a measure of melt/softening point. It is run according to ASTM Method D36. Viscosity of the material is measured at 375° F. according to ASTM Method D4402. Low temperature flexibility is measured according to ASTM Method D3111, which is specific to the mandrel size and the specimen size. It reports the lowest temperature passing a 180 degree bend over a two second period. Elongation is measured by ASTM Method D412 at 77° F., as is recovery from 300% elongation. Volatile emissions are collected over a two-hour period by heating a sample to 375° F. and drawing all the fumes emitted through a toluene-filled receiver. The solvent is then analyzed by a GC MS technique according to Environmental Protection Agency ("EPA") Method 8270.

EXAMPLE 1

A Type I coal tar pitch with a softening point of 135° F. (about 57° C.) was charged to a heated mixing vessel and allowed to thermally equilibrate in the range of 350 to 375° F. A charge of a linear NBR having a 33% acrylonitrile content in powder form and dusted with a calcium carbonate partitioning agent was used for the experiments of Example 1. The NBR is commercially available from Goodyear Chemical and is sold under the tradename CHEMIGUM P609. It typically has a Mooney viscosity of 85, and the $CaCO_3$ partitioning agent is present at about 9% by weight. The polymer charge was added in even increments and dispersed through the use of a high speed paddle-type mixer, while the temperature was maintained in the desired range. The specific mixer used was an air-driven Fawcett Model 103A. The blend was mixed for 60 minutes. Throughout the blending process, the mixture was observed visually for change in texture from grainy to smooth. Blending was terminated based on a smooth visual appearance.

In the experiment designated as 1A, no NBR rubber was added to the coal tar pitch, to provide an example of a control case to demonstrate the properties of the unmodified coal tar pitch. In the experiment designated as 1B, 2.5 parts by weight of the NBR rubber were added to 97.5 parts by weight of the coal tar pitch. Similarly, experiments 1C and 1D were conducted with increasing amounts of NBR, as in Table 1.

TABLE 1

| Experiment % by weight | 1A | 1B | 1C | 1D |
|---|---|---|---|---|
| Coal Tar Pitch | 100 | 97.5 | 95 | 90 |
| NBR | 0 | 2.5 | 5 | 10 |

The resulting blends were analyzed for changes in penetration, R&B softening point, viscosity, low temperature flexibility and elongation according to the test methods specified above. As noted above, the low temperature flexibility is very specific to the mandrel and specimen size. In this case, a one-inch mandrel was used and a one-inch by six-inches by 0.1-inch specimen was used on the mandrel. Table 2 describes the results of these analyses:

TABLE 2

| Experiment | 1A | 1B | 1C | 1D |
|---|---|---|---|---|
| Penetration (dmm) | 6 | 6 | 9.6 | 11.5 |
| Softening point (° F.) | 135 | 150 | 158 | 190 |
| Viscosity (centipoise) | 25 | 185 | 425 | 843 |
| Low temperature flexibility (° F.) | 80 | 80 | 80 | 80 |
| Elongation (%) | N/A | 25 | 50 | 60 |

In the elongation test, the control sample (1A) was too brittle to obtain a meaningful reading.

These data show that adding NBR rubber to the Type I car tar pitch increases the softening point, needle penetration and viscosity. The addition of NBR makes no marked change or improvement on low temperature flexibility, although it makes some increase in elongation. Experiments directed to the application of the mixtures represented by experiments 1C and 1D show that they are too viscous to be applied with the conventional mopping technique as an interply adhesive to achieve an application rate of 30 pounds per 100 square feet at 375° F. However, examples 1C and 1D each show softening point values which make them capable of being used in higher slope applications than that of a conventional Type I coal tar pitch, which is limited to a maximum slope change of 0.25 inches per foot with a softening point specification range of 126 to 140° F.

EXAMPLE 2

The same procedure, NBR rubber and coal tar pitch as in Example 1 were used for Example 2. However, a plasticizer, specifically, di-octyl adipate ("DOA"), commercially available from Harwick Chemical of Akron, Ohio, was added immediately following the charge of coal tar at three different levels to determine the benefit thereof. The levels of DOA addition are designated as experiments 2A through 2C, as shown in Table 3:

TABLE 3

| Experiment % by weight | 2A | 2B | 2C |
|---|---|---|---|
| Coal Tar Pitch | 92.5 | 90 | 96.5 |
| NBR | 5 | 5 | 2.5 |
| DOA | 2.5 | 5 | 1 |

The resulting compositions were tested similarly to the compositions in Example 1, although additional tests were conducted for low temperature flexibility using different mandrel and specimen sizes. "Flexibility 1" below refers to the same one-inch mandrel and one-inch by six-inches by 0.1-inch specimen. In "Flexibility 2", a 0.5-inch mandrel was used and a 0.5-inch by three-inch by 0.05-inch specimen was used. Also, a recovery from 300% elongation test was used because the elongation tests were so successful, and is reported below as "Recovery". Table 4 shows the results of the analyses:

TABLE 4

| Experiment | 2A | 2B | 2C |
|---|---|---|---|
| Penetration (dmm) | 28 | 50 | 20 |
| Softening point (° F.) | 148 | 135 | 145 |
| Viscosity (centipoise) | 325 | 225 | 100 |
| Flexibiliity 1 (° F.) | 60 | 45 | 70–75 |
| Flexibility 2 (° F.) | no data | 30–35 | 65–70 |
| Elongation (%) | 2000+ | 2000+ | 1500 |
| Recovery (%) | 50 | 45 | 55 |

These results show that the DOA plasticizer decreases the viscosity and softening point, but it markedly improves the low temperature flexibility, which is indicated by the material being flexible at a lower temperature. Although this is not a direct measure of the lowering of glass transition temperature, the lower flexibility temperatures are suggestive of lower glass transition temperature. Elongation is also very significantly increased, and the penetration is also increased. The recovery from 300% elongation was measured and it was determined that recovery, or more descriptively, recoupable strain was imparted to these compositions. The modified coal tar pitch created in experiments 2A through 2C show elastomeric properties with elongation recoverable strain. These latter properties also suggest lowered glass transition temperature. Increasing plasticizer level lowers viscosity and softening point while increasing penetration and improving low temperature flexibility. Experiments to test application of the 2A and 2B compositions show that the 2A composition is marginally acceptable in viscosity mopping as an interply adhesive and composition 2B was acceptable to achieve the desired application rate of 30 pounds per 100 square feet at 375° F. Composition 2C provides a material which is considered commercially viable.

EXAMPLE 3

The Example 3 experiments were intended to measure the efficacy of different plasticizers or process oils, at the same level of the di-octyl adipate addition in experiment 2A, that is, 5 parts by weight of plasticizer per 90 parts by weight of coal tar pitch and 5 parts per weight of NBR. The same procedure, NBR rubber and coal tar pitch as in Example 1 were used. In experiment 3A, the plasticizer used was di-octyl phthalate, obtained from Harwick Chemical in Akron, Ohio. In experiment 3B, the plasticizer was HERCOFLEX 600, a high-boiling monomeric ester from Hercules, Inc., of Wilmington, Del. In experiment 3C, the plasticizer used was PLASTHALL 7050, a monomeric di-ester produced by The C.P. Hall Company of Stow, Ohio. In experiment 3D, the plasticizer was VIPLEX 525, a heavy refined naphthenic oil from Crowley Chemical of New York, N.Y. Low temperature flexibility in this case was tested using the one-inch mandrel and with a one-inch by six-inch by 0.1-inch specimen, as in Example 1. After producing the compositions, they were tested in the same manner as reported above in the other examples and the results are as follows in Table 5:

TABLE 5

| Experiment | 3A | 3B | 3C | 3D |
|---|---|---|---|---|
| Penetration (dmm) | 30 | 25 | 44 | 15 |
| Softening point (° F.) | 152 | 148 | 136 | 146 |
| Viscosity (centipoise) | 300 | 310 | 250 | 312 |
| Low temperature flexibility (° F.) | 50 | 50 | 50 | 70 |
| Elongation (%) | N/A | 2000+ | 2000+ | 2000+ |

These results show that each of the plasticizers tested is effective, although they have different net effects.

EXAMPLE 4

In Example 4, an RT-12 grade refined coal tar was substituted for the Type I coal tar pitch which had been used in Example 1. This RT-12 coal tar may be characterized as being softer, less viscous and having more low end coal tar fractions than the Type I coal tar pitch. The RT-12 coal tar was charged to a heated mixing vessel and allowed to thermally equilibrate in the range of 350 to 375° F. A charge of a linear NBR having a 33% acrylonitrile content in powder form and dusted with a calcium carbonate partitioning agent was used for the experiments of Example 1. The NBR is commercially available from Goodyear Chemical and is sold under the tradename CHEMIGUM P609. It typically has a Mooney viscosity of 85, and the $CaCO_3$ partitioning agent is present at about 9% by weight. The polymer charge was added in even increments and dispersed through the use of a high speed paddle-type mixer. The specific mixer used was an air-driven Fawcett Model 103A. The blend was mixed for 60 minutes. Throughout the blending process, the mixture was observed visually for change in texture from grainy to smooth. Blending was terminated based on a smooth visual appearance.

In the experiment designated as 4A, no NBR rubber was added to the RT-12 grade coal tar, to provide an example of a control case to demonstrate the properties of the unmodified coal tar. In the experiment designated as 4B, 5 parts by weight of the NBR rubber were added to 95 parts by weight of the coal tar. Similarly, in experiment 1C, 10 parts by weight of NBR rubber were added to 90 parts by weight of coal tar, as shown in Table 6. No plasticizer was used in any of these experiments.

TABLE 6

| Experiment % by weight | 1A | 1B | 1C |
|---|---|---|---|
| Coal Tar | 100 | 95 | 90 |
| NBR | 0 | 5 | 10 |

The resulting blends were analyzed for changes in penetration, R&B softening point, viscosity, low temperature flexibility and elongation according to the test methods specified above. The low temperature flexibility was conducted using a one-inch mandrel was used and a one-inch by six-inches by 0.1-inch specimen was used on the mandrel. Table 7 describes the results of these analyses:

TABLE 7

| Experiment | 4A | 4B | 4C |
|---|---|---|---|
| Penetration (dmm) | 260 | 79 | 68 |
| Softening point (° F.) | 93 | 129 | 138 |
| Viscosity (centipoise) | 12 | 400 | 1100 |

TABLE 7-continued

| Experiment | 4A | 4B | 4C |
|---|---|---|---|
| Low temperature flexibility (° F.) | N/A | 50 | 40 |
| Elongation (%) | N/A | 2000+ | 2000+ |

In the elongation test, the control sample (4A) was in a fluid-like state at 77° F. and could not be meaningfully tested.

These data show that adding NBR rubber to the RT-12 grade refined coal tar can produce desirable properties such as rubber-like elongations, and low temperature flexibilities much lower than standard coal tar pitch, each of which indicates improved toughness. These compositions utilizing NBR with refined coal tar are suitable for application in roofing and sealants.

VOLATILES EMISSIONS

In addition, the product compositions from experiments 1A and 2B were analyzed for volatile fumes emissions. As will be recalled, the experiment 1A composition is a 100% Type I coal tar pitch, while the experiment 2B composition has 90% by weight Type I coal tar pitch, 5% NBR and 5% DOA. The samples were heated to 375° F. for a two hour period during which the evolved fumes were trapped in a toluene-filled receiver. The solvent was analyzed by an EPA method described above.

The results of the analysis of the volatiles emitted is as follows in Table 8:

TABLE 8

| COMPOUND | Composition 2B ($\mu g/kg$) | Composition 1A ($\mu g/kg$) |
|---|---|---|
| CRESOLS | | |
| 2,4-dimethylphenol | 100 | not detected |
| 2-methyphenol | not detected | 140 |
| 4-methylphenol | 310 | 470 |
| phenol | 143 | 310 |
| 2 RING AROMATICS | | |
| 2-methyl naphthalene | 4700 | 24000 |
| naphthalene | 14000 | 85000 |
| 1-methyl naphthalene | 580 | 460 |
| 3-RING AROMATICS | | |
| anthracene | 9700 | not detected |
| dibenzofuran | 23000 | 92000 |
| fluorene | 24000 | 52000 |
| phenanthrene | 79000 | 78000 |
| 9-anthracenacarbonitrile | 4200 | not detected |
| dibenzothiophene | not detected | 490 |
| 4 RING AROMATICS | | |
| acenaphthene | 52000 | 105000 |
| benzo(a)anthracene | 3200 | 3600 |
| chrysene | 2700 | not detected |
| fluoranthene | 18000 | 80000 |
| pyrene | 43000 | 54000 |
| 2-methyl pyrene | not detected | 2600 |
| HIGHER AROMATICS | | |
| benzo(b)fluoranthene | 630 | 500 |
| benzo(k)fluoranthene | 980 | 750 |
| benzo(a)pyrene | 710 | 510 |
| indeno(123 ij)isoquinoline | not detected | 3000 |
| 11H-benzo(b)fluorene | not detected | 1300 |
| TOTALS | 280953 | 584430 |

The clear conclusion from this analysis is that the modified coal tar pitch from experiment 2B is a much lower emitter of potentially carcinogenic polynuclear aromatics than the unmodified coal tar pitch from experiment 1A in addition to having superior properties as a roofing composition.

The experimental data show that the inclusion of the NBR rubber and, in some cases, a plasticizer, show a marked improvement in product flexibility, which indicates that the glass transition temperature has been reduced. This allows the composition to be more flexible and durable at lower temperatures, resisting cracking and adhesion failures when the product is subjected to cyclic thermal and/or mechanical loads. The inclusion of the modifiers also provides substantially increased elastomeric properties.

These improvements result in compositions which are suitable for use in roofing applications. These compositions may be used in kettle-applied applications, as well as starting formulations for further coal tar related products, including membranes, sealants, adhesives, crack fillers, surface coatings, interply bonding layers and flashing applications.

The experimental results suggest that effective plasticizers for this composition include di-alkyl esters of dicarboxylic acids, including linear acids such as succinic acid, glutaric acid, adipic acid, pimelic acid, suberic acid, azelaic acid, sebacic acid and aromatic acids, such as phthalic acid, isophthalic acid and terephthalic acid. The particularly effective alkyl groups include the alkyl groups having from about 5 to about 12 carbon atoms, with octyl groups being preferred.

Although the preferred embodiments of the present invention have been described above in detail, the same is by way of illustration and example only and is not to be taken as a limitation on the present invention. Accordingly, the scope and content of the present invention are to be defined only by the terms of the appended claims.

What is claimed is:

1. A modified coal tar consisting essentially of:
   an RT-grade coal tar;
   a nitrite butadiene rubber;
   wherein the coal tar and the nitrile butadiene rubber are blended; and
   wherein the coal tar is present in the range of from about 80 to about 98% by weight and the nitrile butadiene rubber is present in the range of from about 20 to about 2% by weight.

2. The modified coal tar of claim 1 wherein the RT-grade coal tar has a softening point in the range of from about 50 F to about 100 F.

3. The modified coal tar of claim 1 wherein the nitrile butadiene rubber has a Mooney viscosity up to about 100.

4. The modified coal tar of claim 3 wherein the nitrile butadiene rubber comprises from about 15 to about 50% by weight acrylonitrile.

5. The modified coal tar of claim 1 wherein the modified coal tar further contains up to about 10 percent by weight of a plasticizer.

6. The modified coal tar of claim 5 wherein the plasticizer is a di-alkyl ester of a di-carboxylic acid.

7. The modified coal tar of claim 6 wherein the plasticizer is selected from the group consisting of di-octyl adipate and di-octyl phthalate.

8. The modified coal tar of claim 1 wherein the coal tar is present in the range of from about 90 to about 98% by weight and the nitrile butadiene rubber is present in the range of from about 10 to about 2% by weight.

9. The modified coal tar of claim 1 wherein the amount of evolved volatiles from the modified coal tar is less than one-half the amount of the evolved volatiles prior to the modification.

10. A process for manufacturing a modified RT-grade coal tar, consisting essentially of:
    a) heating a coal tar to a temperature at which the coal tar is molten and comprises a continuous phase;
    b) adding a nitrile butadiene rubber and a plasticizer to the molten coal tar to form a molten blend thereof; and
    c) agitating the molten blend until a homogeneous distribution of the coal tar, nitrile butadiene rubber and plasticizer is achieved.

11. The process of claim 10 wherein the process is conducted at a temperature in the range from about 300° F. to about 400° F.

12. The process of claim 10 wherein the nitrile butadiene rubber and plasticizer are added in increments over a period of about fifteen minutes in step b).

* * * * *